United States Patent
Cron et al.

(10) Patent No.: US 11,654,717 B2
(45) Date of Patent: May 23, 2023

(54) REINFORCED ANNULAR SUPPORT FOR A TIRE

(71) Applicants: Steven M. Cron, Simpsonville, SC (US); Damon Christenbury, Greenville, SC (US); COMPAGNIE GENERALE DES ETABLISSEMENTS MICHELIN, Clermont-Ferrand (FR)

(72) Inventors: Steven M. Cron, Simpsonville, SC (US); Damon Christenbury, Greenville, SC (US)

(73) Assignee: COMPAGNIE GENERALE DES ESTABLISSEMENTS MICHELIN, Clermont-Ferrand (FR)

(*) Notice: Subject to any disclaimer, the term of this patent is extended or adjusted under 35 U.S.C. 154(b) by 360 days.

(21) Appl. No.: 16/954,929

(22) PCT Filed: Dec. 21, 2017

(86) PCT No.: PCT/US2017/067906
§ 371 (c)(1),
(2) Date: Jun. 17, 2020

(87) PCT Pub. No.: WO2019/125467
PCT Pub. Date: Jun. 27, 2019

(65) Prior Publication Data
US 2020/0376890 A1    Dec. 3, 2020

(51) Int. Cl.
*B60C 7/14* (2006.01)
*B60C 7/12* (2006.01)
*B60C 7/20* (2006.01)

(52) U.S. Cl.
CPC ............... *B60C 7/14* (2013.01); *B60C 7/125* (2013.01); *B60C 7/20* (2013.01)

(58) Field of Classification Search
CPC  B60C 7/125; B60C 7/14; B60C 7/146; B60C 7/18; B60C 7/20
See application file for complete search history.

(56) References Cited

U.S. PATENT DOCUMENTS

| 1,462,440 A | 7/1923 | Bauman |
| 3,394,751 A | 7/1968 | Sidles et al. |
| 2008/0115871 A1 | 5/2008 | Sandstrom |

(Continued)

FOREIGN PATENT DOCUMENTS

| JP | 2015113080 A | * | 6/2015 |
| KR | 20130056788 A | * | 5/2013 |

(Continued)

OTHER PUBLICATIONS

International Search Report and Written Opinion Thereof, PCT Application No. of PCT/US2017/067906, dated Jun. 29, 2018, 29 pages.

*Primary Examiner* — Kip T Kotter
(74) *Attorney, Agent, or Firm* — Dority & Manning, P.A.

(57) ABSTRACT

A non-pneumatic tire (100) having a pair of opposing annular support structures (102, 104) that extend circumferentially around the tire. Each support structure (102, 104) includes a radially-inner joint (120), a radially-outer joint (122), and a pair of support legs (132, 134) connected with a central joint portion (148). An annular band connects with the support structures (102, 104).

14 Claims, 7 Drawing Sheets

(56) References Cited

U.S. PATENT DOCUMENTS

| | | | |
|---|---|---|---|
| 2009/0173421 A1 | 7/2009 | Love et al. | |
| 2015/0174954 A1* | 6/2015 | Asper | B60C 7/10 152/5 |
| 2017/0080756 A1* | 3/2017 | Van Riper | B60B 9/26 |
| 2017/0157984 A1* | 6/2017 | Van Riper | B60C 7/18 |
| 2017/0313125 A1 | 11/2017 | Novoplanski | |

FOREIGN PATENT DOCUMENTS

| | | |
|---|---|---|
| KR | 101796231 B1 * | 12/2017 |
| WO | WO2005063505 | 7/2005 |

* cited by examiner

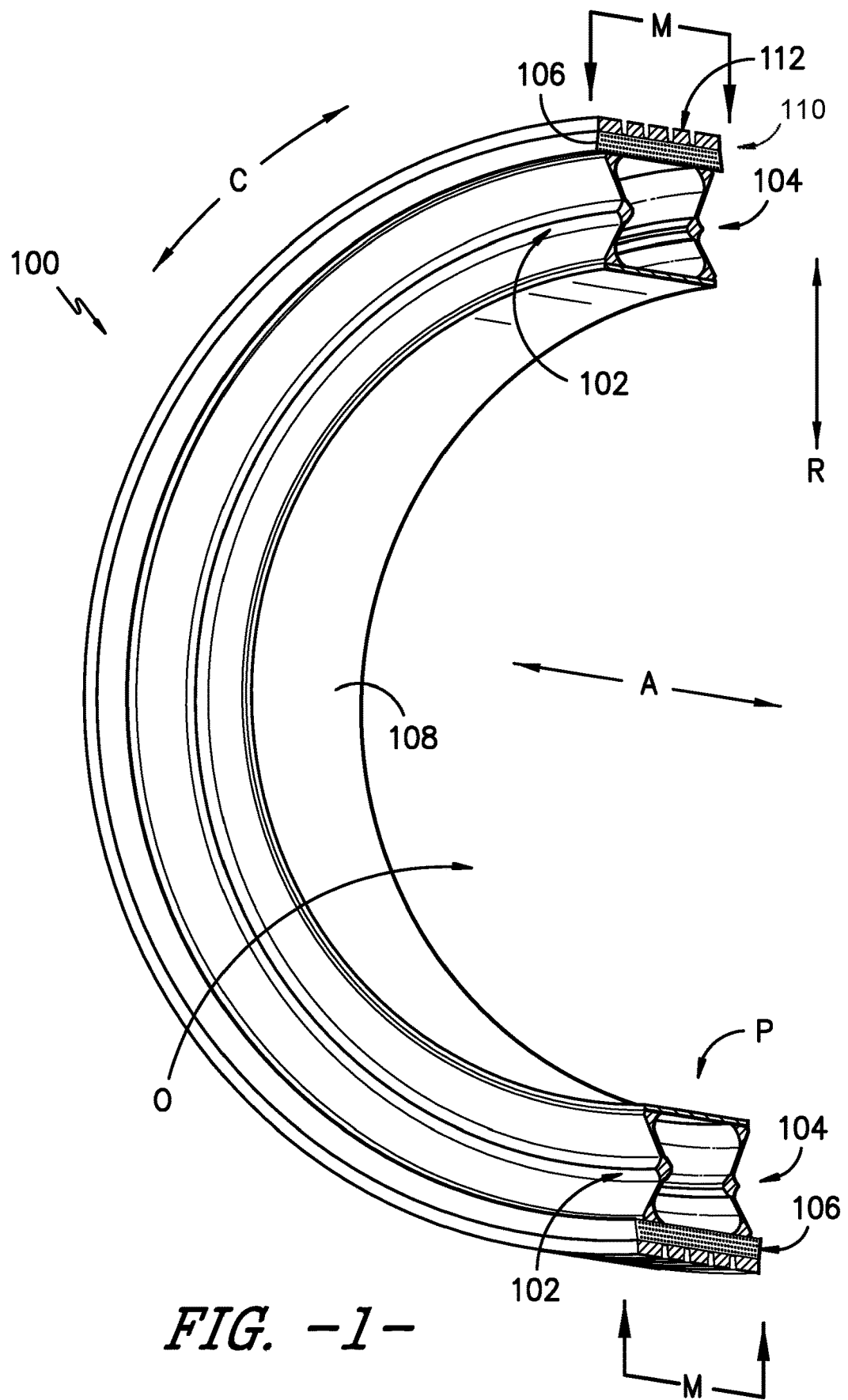
FIG. -1-

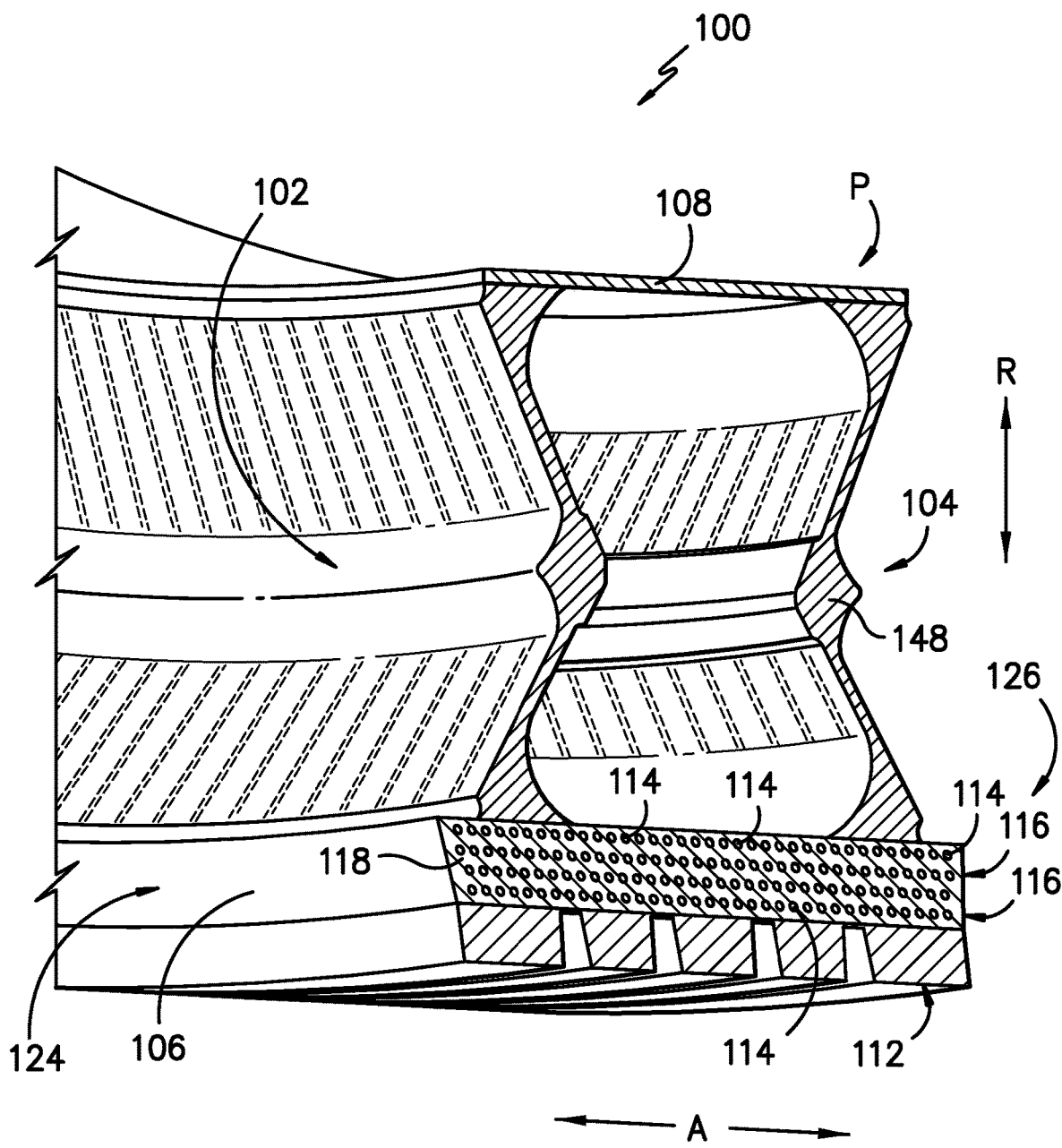
FIG. -2-

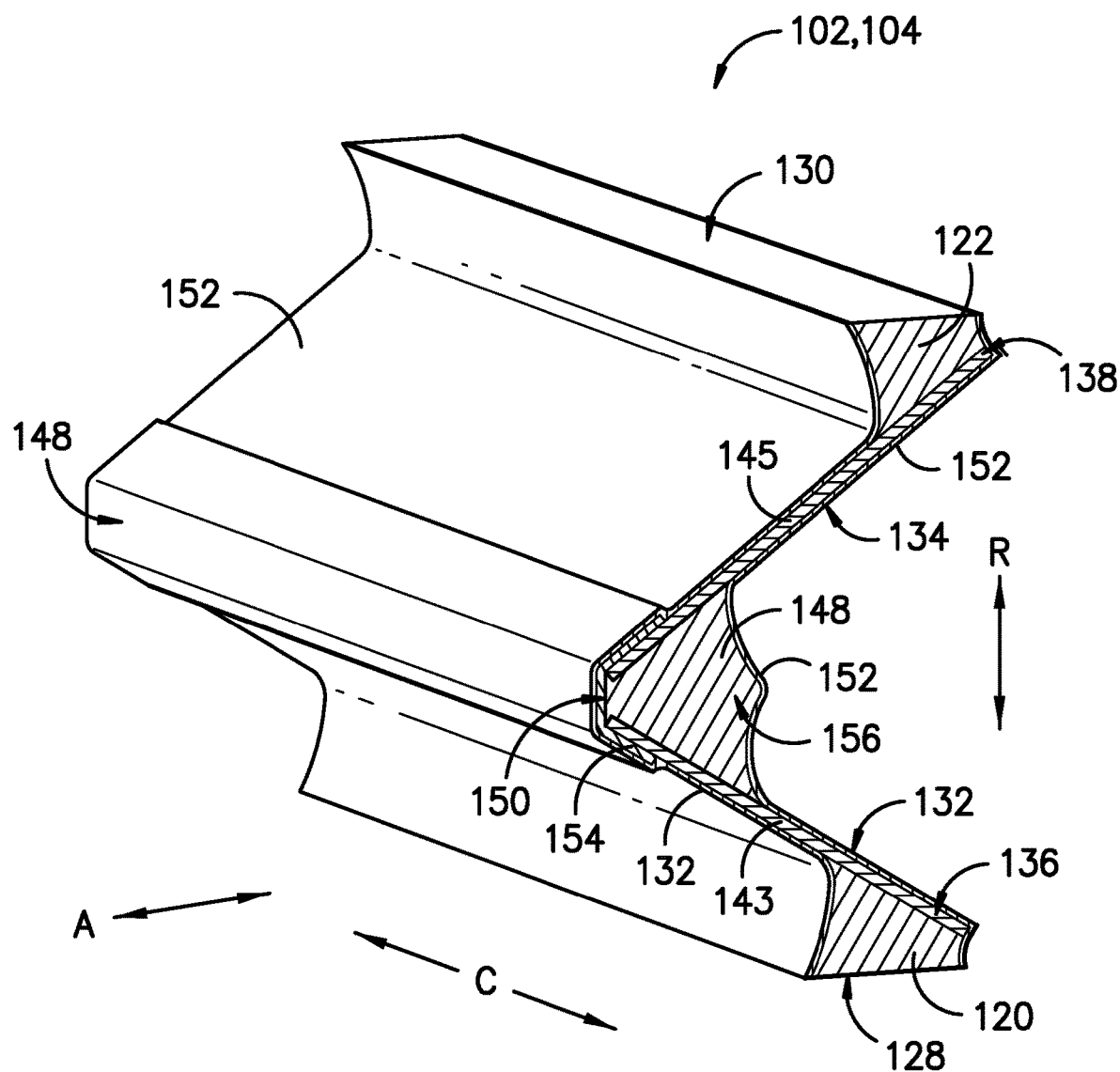
FIG. -3-

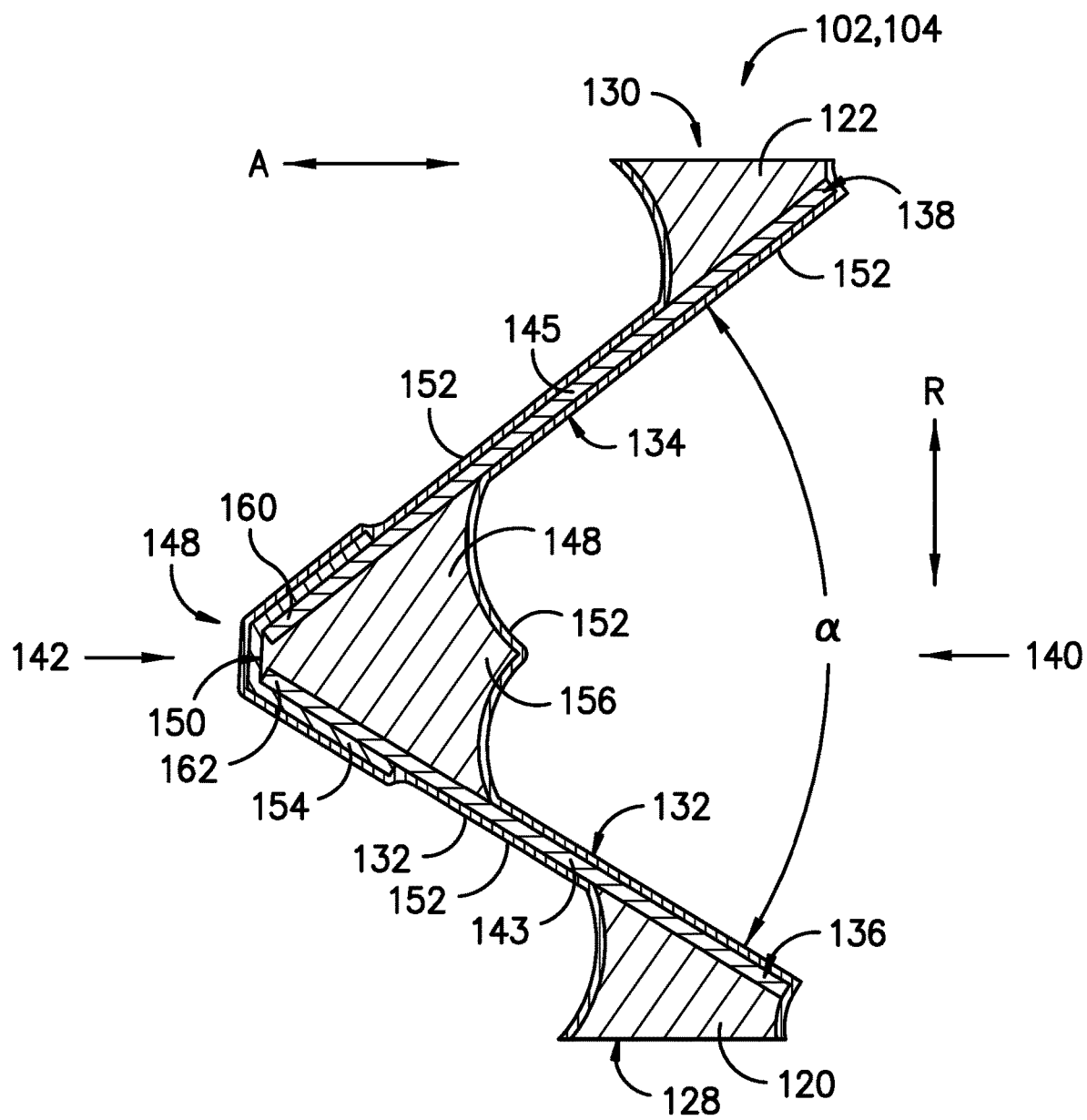
FIG. -4-

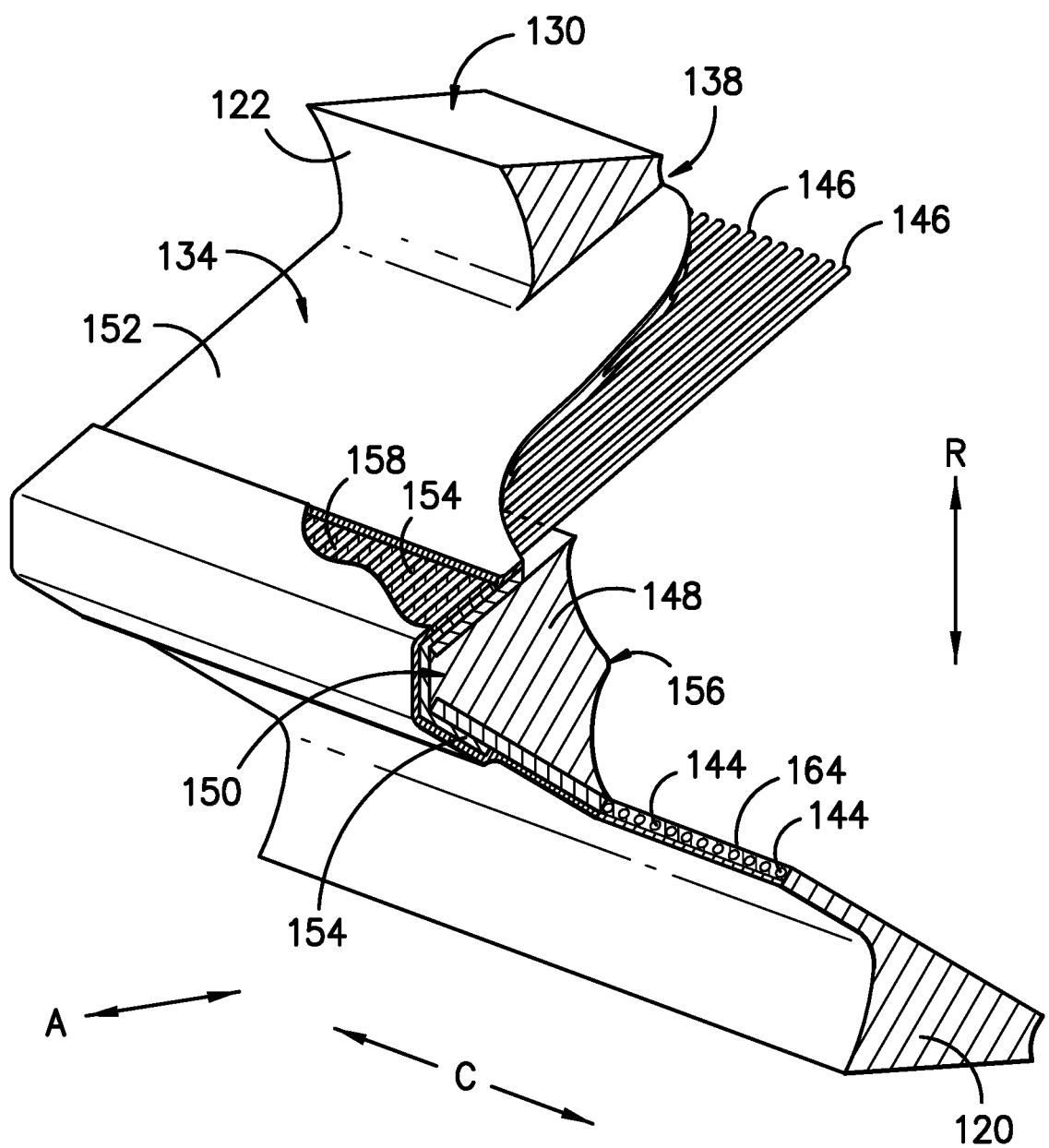
FIG. -5-

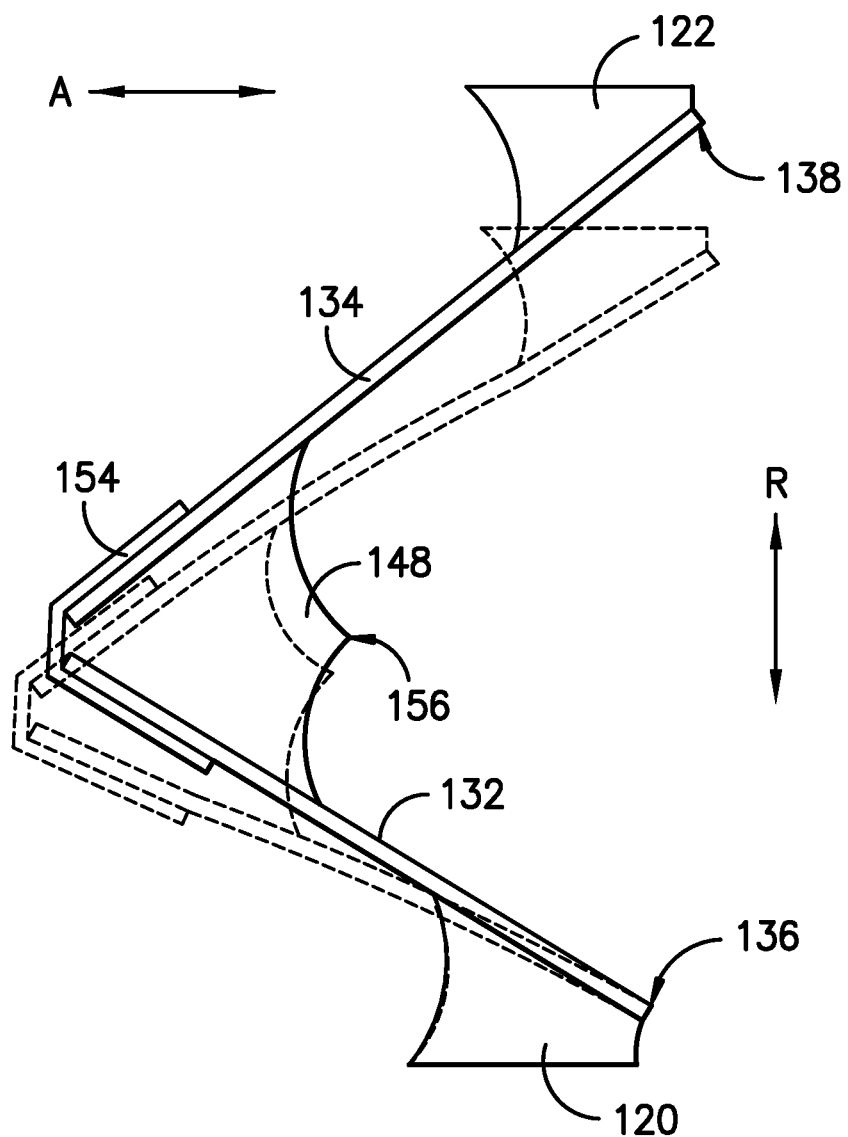
FIG. -6-

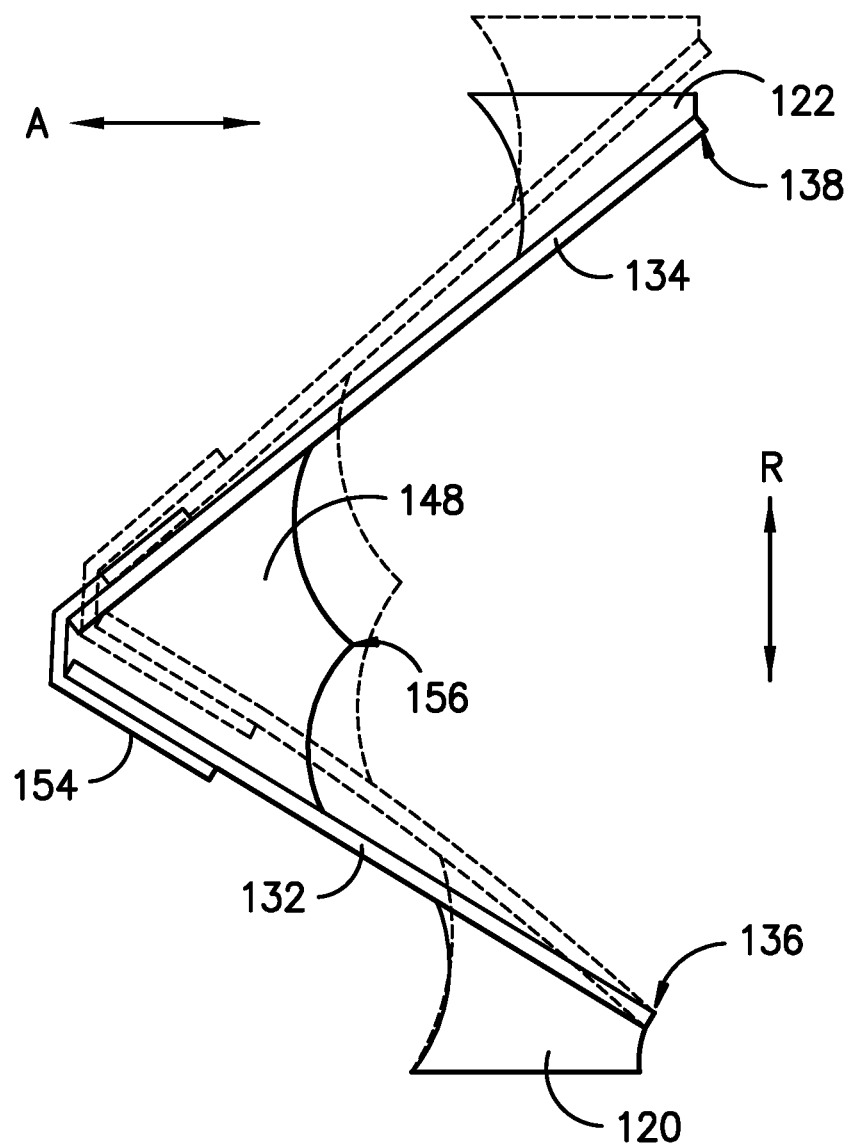
FIG. -7-

REINFORCED ANNULAR SUPPORT FOR A TIRE

CROSS-REFERENCE TO RELATED APPLICATIONS

The present application is a § 371 Application of PCT/US2017/067906 filed on Dec. 21, 2017, all of which is incorporated herein by reference for all purposes.

FIELD OF THE INVENTION

The subject matter of the present disclosure relates generally to a reinforced annular support for a non-pneumatic tire and a tire incorporating such reinforced annular support.

BACKGROUND OF THE INVENTION

The pneumatic tire is a known solution for compliance, comfort, mass, and rolling resistance. However, the pneumatic tire has disadvantages in complexity, the need for maintenance, and susceptibility to damage. A device that improves on pneumatic tire performance could, for example, provide more compliance, better control of stiffness, lower maintenance requirements, and resistance to damage.

Non-pneumatic tire or wheel constructions provide certain such improvements. The details and benefits of non-pneumatic tire or non-pneumatic wheel constructions are described in e.g., U.S. Pat. Nos. 6,769,465; 6,994,134; 7,013,939; and 7,201,194. Certain non-pneumatic tire and wheel constructions propose incorporating a resilient, annular shear band, embodiments of which are described in e.g., U.S. Pat. Nos. 6,769,465 and 7,201,194. Such non-pneumatic tire and wheel constructions provide advantages in performance without relying upon a gas inflation pressure for support of the nominal loads applied to the tire or wheel.

In some non-pneumatic constructions, vehicle load is applied to a wheel hub that is connected with an annular shear band through load bearing members in the form of e.g., multiple webs or spokes. These members can transmit the load to the annular shear band through e.g., tension, compression, or both. A layer of tread can be applied to the shear band to provide protection against the travel surface.

The addition of material or weight to a tire construction generally decreases energy efficiency. Accordingly, a design for a non-pneumatic tire that can reduce the amount of material or weight would be advantageous.

Some non-pneumatic tire constructions may have an undesirable level of lateral (i.e. along the axial direction) stiffness. Such stiffness may adversely affect components (e.g., suspension components) of the vehicle and result in an undesirable experience of a driver of a vehicle. Accordingly, a design for a non-pneumatic tire that can decrease lateral stiffness is desirable.

SUMMARY OF THE INVENTION

The present invention provides a non-pneumatic tire. A pair of opposing annular support structures extend circumferentially around the tire and are constructed in a manner than can reduce the weight, improve the lateral stiffness, and/or provide other advantageous features. Additional objects and advantages of the invention will be set forth in part in the following description, or may be apparent from the description, or may be learned through practice of the invention.

In one exemplary embodiment of the present invention, a tire is provided that defines axial, radial, and circumferential directions. The tire includes an annular band having a pair of opposing sides. A pair of opposing annular supports are spaced apart from each other along the axial direction with each annular support extending around the tire along the circumferential direction. The annular supports extend radially inward from the opposing sides of the annular band. Each annular support includes a radially-inner support leg, a radially-outer support leg forming a non-zero angle with the radially-inner support leg, and a central joint connecting the radially-inner support leg and the radially outer support leg. A radially-inner joint is connected to the radially-inner support leg. A radially-outer joint is connected with radially-outer support leg and incorporated with the annular band. The central joint allows the radially-inner support leg and radially-outer support leg to move relative to each other.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective and cross-sectional view of one-half of an exemplary embodiment of a tire of the present invention.

FIG. 2 illustrates a perspective and cross-sectional view along a radial plane of a portion of the exemplary embodiment of FIG. 1.

FIG. 3 illustrates a perspective view of a portion of an exemplary reinforced annular support as may be used in the embodiment of a tire shown in FIG. 1.

FIG. 4 provides a cross-sectional view along a radial plane of the exemplary reinforced annular support of FIG. 3.

FIG. 5 is a perspective and partial cross-sectional view of the exemplary reinforced annular support of FIGS. 3 and 4 with portions of various components removed for purposes of illustration.

FIGS. 6 and 7 are side views of portions of the exemplary reinforced annular support of FIGS. 3, 4, and 5 in compression and tension as further described herein.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

"Axial direction" or the letter "A" in the figures refers to a direction parallel to the axis of rotation of for example, the annular band, tire, and/or wheel as it travels along a road surface.

"Radial direction" or the letter "R" in the figures refers to a direction that is orthogonal to axial direction A and extends in the same direction as any radius that extends orthogonally from the axial direction.

"Circumferential direction" or the letter "C" in the figures refers to a direction is orthogonal to axial direction A and orthogonal to a radial direction R.

"Radial plane" means a plane that passes perpendicular to the equatorial plane and through the axis of rotation of the wheel.

"Elastic material" or "Elastomer" as used herein refers to a polymer exhibiting rubber-like elasticity, such as a material comprising rubber.

"Elastomeric" as used herein refers to a material comprising an elastic material or elastomer, such as a material comprising rubber.

"Deflectable" means able to be bent resiliently.

"Nominal load" or "desired design load" is a load for which the structure is designed to carry. More specifically, when used in the context of a wheel or tire, "nominal load" refers to the load for which the wheel or tire is designed to carry and operate under. The nominal load or desired design load includes loads up to and including the maximum load specified by the manufacturer and, in the case of a vehicle tire, often indicated by marking on the side of a the tire. A loading condition in excess of the nominal load may be sustained by the structure, but with the possibility of structural damage, accelerated wear, or reduced performance. A loading condition of less than nominal load, but more than an unloaded state, may be considered a nominal load, though deflections will likely be less than deflections at nominal load.

"Modulus" or "Modulus of elongation" (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Referring now to FIG. 1, a perspective view of one-half of an exemplary embodiment of a tire 100 of the present invention is illustrated. Tire 100 is symmetrical about plane M through which the cross-section of FIG. 1 is taken. FIG. 2 provides a close up of the cross-section at one end P of the exemplary tire 100 of FIG. 1 with incorporation onto a hub 108. During use, tire 100 rotates about an axis of rotation that is parallel to axial direction A.

Tire 100 includes a pair of deflectable, reinforced annular supports 102, 104 that each extend around tire 100 along circumferential direction C to encircle an opening O. Each composite annular support 102, 104 is configured as a wall-like structure that, for this exemplary embodiment, extends along radial direction R between a resilient, annular band 106 and e.g., a cylindrically-shaped annular hub 108. Resilient annular supports 102, 104 are positioned in an opposing, spaced-apart manner along axial direction A. Annular supports 102, 104 are connected with opposing sides 124 and 126 (FIG. 2), respectively, of annular band 106 and extend radially-inward therefrom. As further described herein, the construction of annular supports 102, 104 is otherwise basically identical.

The mounting of tire 100 on hub 108 is provided by way of example only. Tire 100 can be incorporated onto e.g., a wheel, hub, or other component positioned within or at opening O to allow tire 100 to be e.g., mounted onto an axle or other component of a vehicle so that the vehicle may roll across a ground surface. By way of non-limiting examples, such vehicle may include a passenger vehicle, heavy duty truck, light duty truck, all-terrain vehicle, bus, aircraft, agricultural vehicle, mining vehicle, bicycle, motorcycle, and others. Tire 100 may be attached to e.g., hub 108 by use of e.g., adhesives, fasteners, and combinations thereof. In still other embodiments, tire 100 and hub 108 may be integrally formed together. Other hub or wheel configurations may be used as well.

An annular tread band 110 is incorporated with resilient annular band 106. Tread band 110 may be e.g., adhered to annular band 106 or may formed integrally with annular band 106. Tread band 110 provides an outer contact surface 112 for contact with the ground or other surfaces as tire 100 rolls across. A variety of shapes and configurations may be used for tread band 100 including e.g., ribs, blocks, and combinations thereof such that the present invention is not limited to the tread shown in the figures. In other embodiments, annular band 106 may be constructed entirely from tread band 110.

Annular band 106 may include a plurality of reinforcing elements 114 that each extend along circumferential direction C around tire 100 within an elastomeric layer 118. For example, elastomeric layer 118 may be constructed from one or more rubber materials, polyurethanes, and combinations thereof. Reinforcing elements 114 may be e.g., cords or cables arranged along axial direction A in multiple rows 116 within layer 118.

In one exemplary embodiment, reinforcing elements 114 are "interlaced" with respect to each other along either radial direction R or axial direction A. Where reinforcing elements 114 are interlaced along axial direction A, imaginary lines extending between the center points of reinforcing elements 114 in adjacent, axially oriented rows 116 will form a rhombus or horizontal diamond having non-orthogonal angles between the sides of the rhombus. In this interlaced, horizontal diamond configuration, reinforcing elements 114 of adjacent, axially-oriented rows 116 are closer together than reinforcing elements 114 within the same axially-oriented row 116. Where reinforcing elements 114 are interlaced along radial direction R, imaginary lines extending between the center point of reinforcing elements 114 in adjacent, axially oriented rows 116 will form a rhombus or vertical diamond having non-orthogonal angles between the sides of the rhombus. In this interlaced, vertical diamond configuration, reinforcing elements 114 along the same, axially-oriented row will be closer together than reinforcing elements in non-adjacent, axially-oriented rows. As will be understood by one of skill in the art using the teachings disclosed herein, during manufacture of tire 100, a perfect positioning of reinforcing elements 114 into the shape of a vertical or horizontal diamond may not be possible due to e.g., the movement of materials during the manufacturing process. As such, slight displacements of the reinforcement elements of either diamond configuration can occur.

Reinforcing elements 114 can be constructed from a variety of materials. For example, reinforcing elements 114 can be constructed from metallic cables, or cables that are constructed from polymeric monofilaments such as PET (polyethylene terephthalate), nylon, or combinations thereof. By way of additional example, reinforcing elements 114 could be constructed from elongate composite elements of monofilament appearance made with substantially symmetrical technical fibers, the fibers being of great lengths and impregnated in a thermoset resin having an initial modulus of extension of at least 2.3 GPa, in which the fibers are all parallel to each other. In such embodiment, the elongate composite elements will deform in an elastic manner up to a compressive strain of at least equal to 2%. As used herein, an "elastic deformation" means that the material will return approximately to its original state when the stress is released. By way of example, the fibers could be constructed from glass, certain carbon fibers of low modulus, and combinations thereof. Preferably, the thermoset resin has a glass transition temperature $T_g$ greater than 130° C. Advantageously, the initial modulus of extension of the thermoset resin is at least 3 GPa. Reinforcing elements 114 could also be constructed from combinations of PET and such elongate composite elements. Additionally, reinforcing elements 114 could be constructed from hollow tubes made from rigid polymers such as e.g., PET or nylon. Other materials may be used as well.

Resilient annular band 106 is configured to undergo deformation as tire 100 rolls across a ground surface and portions of band 106 pass through a contact patch where outer contact surface 112 makes contact with the ground surface. Through such deformation, annular band 106 can allow outer contact surface 112 to become planar in the contact patch. Annular band 106 with e.g., reinforcement elements 114 also provides strength to support and carry a nominal load applied to tire 100 through hub 108 or other means of attachment to a vehicle. As will be further described, such nominal load may be applied to annular band 106 through compression, tension, or both, of reinforced annular supports 102, 104.

As tire 100 rolls across e.g., a ground surface, a portion each annular support 102, 104 near the contact patch may flex under compression as the outer contact surface 112 passes through the contact patch. Smaller deflections of annular supports 102, 104 may occur elsewhere but the greatest deflection of supports 102, 104 will likely occur near the contact patch. As the same time, other portions of each annular support 102, 104 may also flex under tension such as e.g., portions opposite the contact patch.

FIG. 3 provides a perspective view of a portion of an exemplary reinforced annular support 102, 104 while FIG. 4 is a cross-sectional view thereof. FIG. 5 is another view of annular support 102, 104 of FIGS. 3 and 4 but with portions of various components removed to reveal certain features as further described herein. The cross-sectional profile in FIG. 4 is continuous along circumferential direction C as supports 102, 104 extend annularly around tire 100. While not depicted in the views of annular support 102, 104 shown in FIGS. 3 through 7, it should be understood that annular support 102, 104 would have a curvature along circumferential direction C as depicted in FIGS. 1 and 2.

Each annular support 102, 104 includes a radially-outer joint 122 and a radially-inner joint 120. As shown, joints 120 and 122 are spaced apart from each other along radial direction R with joint 120 being radially inward of joint 122. By way of example, joint 120, 122 may each be constructed from an elastomeric material that extends continuously along circumferential direction C about tire 100.

For this exemplary embodiment, along one side, radially-outer joint 122 includes a radially-outer connecting surface 130 that is continuous along circumferential direction C and has a width along axial direction A. Although shown as flat in e.g., FIG. 3, surface 130 is curved along circumferential direction C. Connecting surface 130 can be incorporated with resilient annular band 106. For example, connecting surface 130 can be adhered (e.g., using a cyanoacrylate adhesive), bonded, mechanically connected, and/or integrally formed with annular band 106. In other embodiments, radially-outer joint 122 may be incorporated with e.g., tread band 110, annular band 106, or combinations thereof.

Similarly, along an opposing side, radially-inner joint 120 includes a radially-inner connecting surface 128. For this exemplary embodiment, connecting surface 128 is also continuous along circumferential direction C and has a width along axial direction A. Although shown as flat in e.g., FIG. 3, surface 128 is curved along circumferential direction C. Connecting surface 128 can be e.g., incorporated with hub 108. For example, connecting surface 128 can be adhered, bonded, mechanically connected, and/or integrally formed with hub 108. In other embodiments, radially-inner joint 120 may be incorporated with e.g., hub 108, a wheel, or combinations thereof.

In one exemplary aspect of the invention, joint 120 and/or 122 may be connected with other components of tire 100 (e.g., with hub 108 or annular band 106) by creating such components from uncured rubber and then curing the rubber components together to form an integral construction. Similarly, in another exemplary aspect, one or more strips of green rubber could be placed between cured or partially cured components and used to cure them together.

In another exemplary aspect of the invention, joints 120 and 122 are constructed from a relatively soft rubber. In one exemplary embodiment, a rubber having a modulus in the range of 1 MPa to 10 MPa can be used. In still another embodiment, a rubber having a modulus of about 4.8 MPa may be used.

Each reinforced annular support 102, 104 also includes a pair of support legs 132 and 134. Radially-inner support leg 132 has a radially-inner end 136 to which radially-inner joint 120 is connected. Radially-outer support leg 134 has a radially-outer end 138 to which radially-outer joint 122 is connected. Along the length of radially-inner support leg 132, radially-inner joint 120 is spaced apart and discrete from a central joint 148. Similarly, along the length of radially-outer support leg 134, radially-outer joint 122 is spaced apart and discrete from central joint 148.

For this exemplary embodiment, each leg 132, 134 extends continuously along circumferential direction C around tire 100. Radially-outer support leg 134 may connected with annular band 106 by radially-outer joint 122. Radially-inner support leg 132 may be connected with hub 108 by radially-inner joint 120.

In certain embodiments, radially-inner support leg 132 may be slightly different in length (as viewed e.g., in the radial cross-section of FIG. 4) than radially-outer support leg 134. More particularly, leg 132 may be shorter than leg 134 or vice-versa. Having e.g., radially-inner support leg 132 shorter than radially-outer support leg 143 may be utilized to better accommodate changes in radius as portions of supports 102, 104 are affected by the passage of contact surface 112 through the contact patch.

Support legs 132, 134 form a non-zero angle α that is less than 180 degrees when tire 100 is not loaded. Legs 132, 134 form a central joint side 140 (same side as angle α) and an opposing leg joint side 142 of each annular support 102, 104. As shown in FIG. 1, for this exemplary embodiment, the central joint sides 140 of supports 102, 104 face outwardly and away from each other along axial direction A. Joints 120 and 122 are positioned on the leg joint side 142 or axially interior side of annular supports 102, 104. In other embodiments of tire 100, central joint sides 140 may face inwardly towards each other along axial direction A—i.e. opposite from that shown in FIGS. 1 and 2.

Continuing with FIGS. 3, 4, and 5, each leg 132 and 134 is constructed from a membrane having a plurality of reinforcements within e.g., rubber or another elastomeric material. For this exemplary embodiment, radially-inner leg 132 includes a radially-inner membrane 143 formed from a plurality of elongate, radially-inner reinforcements 144 surrounded by a rubber material 164 (FIG. 5). Radially-outer leg 134 includes a radially-outer membrane 145 formed from a plurality of elongate, radially-outer reinforcements 146 surrounded by another rubber material.

Radially-inner leg 132 extends between a radially-outer end 162 at a central joint 148 and a radially-inner end 136 at joint 120. Radially-outer leg 134 extends between a radially-inner end 160 at central joint 148 and radially-outer end 138 at joint 122. For the exemplary embodiment shown in the figures, legs 132 and 134 are not connected at central joint 148. In other embodiments, 132 and 134 may be connected at ends 160 and 162 near central joint 148.

Radially-inner reinforcements 144 are adjacent to one another and extend along radial direction R between radially-outer end 162 and radially inner end 136. Radially-outer reinforcements 146 are adjacent to one another along the circumferential direction and extend along radial direction R between radially-inner end 160 and radially outer end 138. In one exemplary aspect, as depicted in FIG. 4, reinforcements 144 are substantially within a first plane while reinforcements 146 are substantially within a second plane that is at a non-zero angle to the first plane. Reinforcements 144 and 146 are not connected for this exemplary embodiment. In other embodiments of the invention, reinforcements 144 and 146 may be connected near tip 150.

Elongate reinforcements 144 and 146 may have a diameter of about 1 mm and may be spaced apart from each other along circumferential direction C at a pace of about 2 mm as measured at radially inner end 136 or radially outer end 138. Other pacings and diameters may be used as well.

In certain exemplary embodiments, reinforcements 144, 146 may be e.g., constructed from filaments formed by pultrusion of a glass reinforced resin. The filaments may have a modulus in the range of 10 GPa to 100 GPa. In still another embodiment, the filaments may have a modulus e.g., approximately 40 GPa. Other materials for construction of reinforcements 144, 146 may be used as well including e.g., carbon fiber such as graphite epoxy, glass epoxy, aramid reinforced resins or epoxy, and combinations thereof. Fiber-reinforced plastic reinforcements 144, 146 or metallic reinforcements 144, 146 may also be used provided such have sufficient flexural rigidity for the nominal loads to be supported by tire 100.

In still another embodiment, support legs 132 and 134 could be constructed from a fiber reinforced plastic. For example, support legs 132 and 134 could be constructed with fiberglass reinforced resin where the fiberglass is formed of e.g., filaments created by pultrusion of a glass reinforced resin. The filaments may have a modulus in the range of 10 GPa to 100 GPa. In still another embodiment, the filaments may have a modulus e.g., approximately 40 GPa. Although shown as a single layer, support legs 132 and 134 may be constructed from multiple layers as well in certain embodiments.

Support legs 132 and 134 are constructed and reinforced in a manner that allows flexural rigidity such that each may deform resiliently as supports 102, 104 are placed under tension and compression during operation of tire 100. For example, support legs 132 and 134 may have a flexural rigidity of approximately 140,000 N-mm$^2$ as measured e.g., by ASTM D709.

Radially-outer end 138 of support leg 134 is attached to radially-outer joint 122 and is allowed to compress or stretch radially-outer joint 122 during operation of tire 100. Similarly, radially-inner end 136 of support leg 132 is attached to radially-inner joint 120 and allowed to compress or stretch radially-inner joint 120 during operation of tire 100.

Each reinforced annular support 102, 104 also includes central joint 148. Central joint 148 connects legs 132 and 134 together and is positioned between them. Central joint 148 is located on central joint side 140 of annular supports 102, 104 whereas joints 120, 122 are located on the opposing, leg joint side 142. In one exemplary embodiment, central joint 148 is constructed from an elastomeric material (e.g., rubber) that extends continuously along circumferential direction C about tire 100. In one exemplary embodiment, a rubber having a modulus in the range of 1 MPa to 10 MPa can be used. In still another embodiment, a rubber having a modulus of about 4.8 MPa may be used. Central joint 148 has a thickness along radial direction R that changes along axial direction A. In the embodiment of tire 100 shown in FIG. 1, for example, the thickness of central joint 148 along radial direction R decreases along axial direction A moving axially inward from one annular support 102, 104 to the other.

Central joint 148 may be reinforced by a central joint membrane 154 located on leg joint side 142 of legs 132 and 134. Central joint membrane 154 is positioned between i) elastomeric covering 152 on one side and ii) legs 132, 134 and central joint 148 on the other side. Membrane 154 may include reinforcements 158 constructed from polyester fibers made from an 1100 by 2 cord with a pace of approximately 1 mm and a tensile modulus of approximately 3750 MPa. In other embodiments, membrane 154 may include reinforcements 158 made from aramid, cotton, nylon, rayon, and combinations thereof. The pace, filament count, cord count, and diameter of such reinforcements may vary. Elongate reinforcements 158 in membrane 154 may have the same orientation as reinforcements 144, 146 along radial direction R as shown in FIG. 5.

For the embodiment depicted in FIGS. 4 and 5, membrane 154 extends approximately ⅕ of the height, along radial direction R, of support 102, 104. Other dimensions may be used as well. Additionally, central joint 148 includes a protrusion 156 along axial direction A that is located about mid-way of the height along radial direction R of joint 148. Other shapes may also be used. Other embodiments of central joint 148 may not include reinforcement membrane 154. Other embodiments of central joint 148 may include reinforcements (constructed of material similar to reinforcements 144, 146) positioned at the center, along radial direction R, of central joint 148 and extending parallel to axial direction A.

Each annular support 102, 104 may have a covering or outer layer 152 made of a rubber or other elastomeric material. Outer layer 152 may be placed on both sides 140, 142 of supports 102, 104. In one exemplary aspect, covering 152 may have a modulus of approximately 5 MPa.

Referring now to FIGS. 6 and 7 (elastomeric covering 152 is not shown for purposes of illustration), during operation of tire 100 as it rolls across a surface, portions of reinforced annular support 102, 104 may be placed in compression while portions may be placed in tension. The dashed lines of FIG. 6 illustrate a portion of annular support 102, 104 undergoing compression while the dashed lines of FIG. 7 illustrate a portion of annular support 102, 104 undergoing tension.

While not intending to be bound to any particular theory, the action of supports 102, 104 during operation of tire 100 will now be described. During compression as depicted in FIG. 6, supports 102, 104 are deformed or flexed radially inward (towards the axis of rotation). In such state, central joint 148 is compressed between support legs 132 and 134. At the same time, radially-outer joint 122 undergoes highest compression along a portion nearest central joint 148 and undergoes lowest compression or undergoes tension on an opposing portion farthest from central joint 148. Similarly, during compression, radially-inner joint 120 undergoes highest compression along a portion nearest central joint 148 and undergoes lowest compression or undergoes tension on an opposing portion farthest from central joint 148.

Conversely, during tension as depicted in FIG. 7, supports 102, 104 are deformed or flexed radially outward (away from the axis of rotation). In such state, central joint 148 is in tension—pulled by support legs 132 and 134. At the same time, radially-outer joint 122 undergoes highest tension along a portion nearest central joint 148 and undergoes lowest tension or compression on an opposing portion farthest from central joint 148. Similarly, during tension, radially-inner joint 120 undergoes—highest tension along a portion nearest central joint 148 and undergoes lowest tension or compression on an opposing portion farthest from central joint 148.

For the embodiment shown, support legs 132 and 134 are not connected directly to hub 108 or annular band 106. During compression (FIG. 6), the distance along radial direction R between radially-inner end 136 and 138 can decrease as legs 132 and 134 move closer together. During tension (FIG. 7), the distance along radial direction R between radially-inner end 136 and 138 can increase as legs 132 and 134 move apart. In each such case, central joint 148 can also act somewhat like a hinge so that the angle α between portions of legs 132 and 134 may change as tire 100 rolls across a surface and support legs 132 and 134 rotate into, and out of, proximity to the contact patch.

The construction of tire 100, and particularly the orientation of annular supports 102, 104, can reduce the overall weight of tire 100 as compared to e.g., tire constructions using multiple spokes or other structural elements spaced apart along the circumferential direction and extending between an annular band and a hub. Additionally, supports 102, 104 can provide reduced lateral stiffness (i.e. stiffness along axial direction A) as opposed to such multiple spoke constructions as well. Because it does not require a gas inflation pressure, non-pneumatic tire 100 also provides other advantages relative to pneumatic tires such as e.g., an ability to continue operation despite certain damage events such as e.g., punctures.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A non-pneumatic tire defining axial, radial, and circumferential directions, the tire comprising:
an annular band having a pair of opposing sides;
a pair of opposing annular supports spaced apart from each other along the axial direction, each annular support extending around the tire along the circumferential direction, the annular supports extending radially inward from the opposing sides of the annular band, each annular support comprising
a radially-inner support leg;
a radially-outer support leg forming a non-zero angle with the radially-inner support leg;
a central joint connecting the radially-inner support leg and the radially: outer support leg, wherein the radially-inner leg has a radially-outer end at the central joint and the radially-outer leg has a radially-inner end at the central joint, wherein the central joint extends continuously along the circumferential direction, and wherein the central joint is discrete from the radially-inner support leg and the radially-outer support leg;
a radially-inner joint connected with the radially-inner support leg;
a radially-outer joint connected with radially-outer support leg and incorporated with the annular band; and
wherein the central joint allows the radially-inner support leg and radially-outer support leg to move relative to each other.

2. The non-pneumatic tire of claim 1, further comprising a hub, wherein the radially-inner joint is incorporated with the hub.

3. The non-pneumatic tire of claim 1, wherein the radially-inner support leg comprises a radially-inner membrane and the radially-outer support leg comprises a radially-outer membrane.

4. The non-pneumatic tire of any of claim 1, wherein the radially-inner support leg and the radially-outer support leg each comprises a plurality of reinforcements.

5. The non-pneumatic tire of claim 4, wherein the radially-outer reinforcements and the radially-inner reinforcements comprise a fiber-reinforced plastic.

6. The non-pneumatic tire of claim 1, wherein the radially-inner support leg comprises a plurality of radially-inner reinforcements that lie substantially within a first plane, and wherein the radially-outer support leg comprises a plurality of radially-outer reinforcements that lie substantially within a second plane forming a non-zero angle with the first plane.

7. The non-pneumatic tire of claim 6, wherein the radially-outer reinforcements extend linearly along the radially-outer support leg and the radially-inner reinforcements extend linearly along radially-inner support leg.

8. The non-pneumatic tire of claim 7, wherein the radially-outer reinforcements and the radially-inner reinforcements are adjacent to each other along the circumferential direction.

9. The non-pneumatic tire of claim 1 wherein the central joint, the radially-inner joint, and the radially-outer joint each comprise an elastomeric material.

10. The non-pneumatic tire of claim 1, further comprising an elastomeric covering positioned onto the radially-inner support leg and radially outer support leg.

11. The non-pneumatic tire of claim 1, wherein each annular support comprises a leg joint side and an opposing central joint side, and further comprising a central joint membrane positioned on the leg joint side of the support legs.

12. The non-pneumatic tire of claim 11, wherein the central joint membrane comprises reinforcements.

13. The non-pneumatic tire of claim 11, wherein the central joint is located on the central joint side, and wherein the radially-inner joint and the radially-outer joint are both located on the leg joint side.

14. The non-pneumatic tire of claim 1, wherein the radially-inner joint and the radially-outer joint each extend continuously along the circumferential direction.

* * * * *